US008612345B2

(12) United States Patent (10) Patent No.: US 8,612,345 B2
Lecuyer et al. (45) Date of Patent: Dec. 17, 2013

(54) ROUTING FOR DIRECT TO ACCOUNT PAYMENTS

(75) Inventors: Nicholas Lecuyer, Centennial, CO (US); Terra Geiger, Boulder, CO (US); Michael Kilbane, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 0 days.

(21) Appl. No.: 12/946,613

(22) Filed: Nov. 15, 2010

(65) Prior Publication Data

US 2012/0123932 A1 May 17, 2012

(51) Int. Cl.
*G06Q 40/00* (2012.01)
(52) U.S. Cl.
USPC .......................................................... 705/39
(58) Field of Classification Search
USPC .......................................................... 705/39
See application file for complete search history.

(56) References Cited

U.S. PATENT DOCUMENTS

| | | | | |
|---|---|---|---|---|
| 5,949,876 | A * | 9/1999 | Ginter et al. | 705/80 |
| 6,122,625 | A * | 9/2000 | Rosen | 705/65 |
| 6,736,314 | B2 * | 5/2004 | Cooper et al. | 235/380 |
| 7,182,252 | B1 * | 2/2007 | Cooper et al. | 235/379 |
| 7,225,156 | B2 * | 5/2007 | Fisher et al. | 705/50 |
| 7,587,363 | B2 * | 9/2009 | Cataline et al. | 705/40 |
| 2002/0055907 | A1 * | 5/2002 | Pater et al. | 705/39 |
| 2004/0039693 | A1 * | 2/2004 | Nauman et al. | 705/39 |
| 2004/0059672 | A1 * | 3/2004 | Baig et al. | 705/40 |
| 2004/0128240 | A1 * | 7/2004 | Yusin | 705/39 |
| 2006/0287953 | A1 * | 12/2006 | Chauhan | 705/39 |
| 2007/0100748 | A1 * | 5/2007 | Dheer et al. | 705/39 |
| 2007/0124242 | A1 * | 5/2007 | Reis, Jr. | 705/39 |
| 2007/0187484 | A1 * | 8/2007 | Cooper et al. | 235/379 |
| 2007/0233597 | A1 * | 10/2007 | Petersen et al. | 705/39 |
| 2010/0211422 | A1 * | 8/2010 | Zanzot et al. | 705/7 |
| 2010/0211495 | A1 * | 8/2010 | Zanzot et al. | 705/37 |
| 2010/0211499 | A1 * | 8/2010 | Zanzot et al. | 705/40 |
| 2010/0325049 | A1 * | 12/2010 | Tanaka | 705/44 |
| 2011/0246358 | A1 * | 10/2011 | Blackhurst et al. | 705/39 |
| 2012/0023008 | A1 * | 1/2012 | Owen et al. | 705/39 |
| 2012/0030100 | A1 * | 2/2012 | Bulawa et al. | 705/40 |
| 2012/0072347 | A1 * | 3/2012 | Conway | 705/44 |
| 2012/0078787 | A1 * | 3/2012 | Mehew et al. | 705/44 |

* cited by examiner

*Primary Examiner* — Kenneth Bartley
(74) *Attorney, Agent, or Firm* — Kilpatrick Townsend & Stockton, LLP (57) ABSTRACT

Various systems and methods are described for analyzing multiple money transfer routing schemes. Each of these multiple money transfer routing schemes may comprise a route to transmit funds from the source for the money transfer transaction to the destination for the money transfer transaction. An internal money transfer routing scheme may refer to a money transfer routing scheme that utilizes a direct money transfer arrangement between the destination of the money transfer transaction and the money transfer network. An external money transfer routing scheme may refer to a money transfer routing scheme that utilizes at least one third party money transfer network between the destination of the money transfer transaction and the money transfer network. The multiple money transfer routing schemes may be analyzed and the preferable money transfer routing scheme at least partially based on the predefined criterion from among the multiple money transfer routing schemes may be identified.

20 Claims, 7 Drawing Sheets

Please select a money transfer option:

| Option | Route | Time | Cost | Guarantee | Recommended? |
|---|---|---|---|---|---|
| 1 | Internal | Same Day | $40 | Fully | Yes |
| 2 | WorldNET | 1-2 Days | $15 | 3rd Party | |
| 3 | Interpay Network | 3 Days | 3% ($11.27) | Receiving Bank | |

● ○ ○

[Complete Transaction]

ROUTING FOR DIRECT TO ACCOUNT PAYMENTS

BACKGROUND OF THE INVENTION

It may be possible to transmit money to an account held at a financial institution from some other financial institution whether or not the two financial institutions have a pre-existing relationship. If the financial institutions do not have a pre-existing relationship (or have only a limited pre-existing relationship), the funds may be transmitted via a third-party financial network. If the financial institutions do have a pre-existing relationship, it may be possible to transmit the funds directly between the financial institutions.

BRIEF SUMMARY OF THE INVENTION

In some embodiments, a method for analyzing multiple money transfer routing schemes to identify a preferable money transfer routing scheme from among the multiple money transfer routing schemes according to at least one predefined criterion is presented. The method may include receiving at least one predefined criterion, wherein the predefined criterion is used to analyze multiple money transfer routing schemes; receiving an indication of a source for a money transfer transaction; and receiving an indication of a destination for the money transfer transaction. The method may also include determining multiple money transfer routing schemes. Each of the multiple money transfer routing schemes may comprise a route to transmit funds from the source for the money transfer transaction to the destination for the money transfer transaction. At least one internal money transfer routing scheme and at least one external money transfer routing scheme may be analyzed. An internal money transfer routing scheme may refer to a money transfer routing scheme that utilizes a direct money transfer arrangement between the destination of the money transfer transaction and the money transfer network. An external money transfer routing scheme may refer to a money transfer routing scheme that utilizes at least one third party money transfer network between the destination of the money transfer transaction and the money transfer network. The method may also include analyzing the multiple money transfer routing schemes; and identifying the preferable money transfer routing scheme at least partially based on the predefined criterion from among the analyzed multiple money transfer routing schemes.

In some embodiments, one or more of the following elements may be present: the multiple money transfer routing schemes may relate to international money transfer routing schemes and the preferable money transfer routing scheme is an international money transfer routing scheme; the preferable money transfer routing scheme may be an internal money transfer routing scheme; the preferable money transfer routing scheme may be an external money transfer routing scheme; the predefined criterion may be used to identify the preferable money transfer routing scheme according to a maximized amount of profitability of the money transfer transaction for the money transfer network. In some embodiments, the predefined criterion is used to identify the preferable money transfer routing scheme according to a minimized amount of time to execute the money transfer transaction. In some embodiments, the method further includes routing the money transfer transaction from the source to the destination according to the preferable money transfer routing scheme. In some embodiments, the method further includes presenting at least a subset of the multiple money transfer routing schemes to a customer; presenting the preferable money transfer routing scheme to the customer; and receiving a selection of a money transfer routing scheme from among at least the subset of the multiple routing schemes and the preferable money transfer routing scheme.

In some embodiments, a system for analyzing multiple money transfer routing schemes to identify a preferable money transfer routing scheme from among the multiple money transfer routing schemes according to at least one predefined criterion is presented. The system may include a money transfer computer system comprising a routing computer system configured to: communicate with multiple external money transfer computer systems; receive at least one predefined criterion, wherein the predefined criterion is used to analyze multiple money transfer routing schemes; receive an indication of a source for a money transfer transaction; receive an indication of a destination for the money transfer transaction; determine multiple money transfer routing schemes. Each of the multiple money transfer routing schemes may include a route to transmit funds from the source for the money transfer transaction to the destination for the money transfer transaction. At least one internal money transfer routing scheme and at least one external money transfer routing scheme may be analyzed. An internal money transfer routing scheme may refer to a money transfer routing scheme that utilizes a direct money transfer arrangement between the destination of the money transfer transaction and the money transfer network. An external money transfer routing scheme may refer to a money transfer routing scheme that utilizes at least one third party money transfer network between the destination of the money transfer transaction and the money transfer network. The routing computer system may also be configured to determine multiple money transfer routing schemes; and identify the preferable money transfer routing scheme at least partially based on the predefined criterion from among the multiple money transfer routing schemes.

In some embodiments, a computer program product stored on a computer-readable storage medium for analyzing multiple money transfer routing schemes to identify a preferable money transfer routing scheme from among the multiple money transfer routing schemes according to at least one predefined criterion may be present. The computer program product's instructions may include instructions for receiving at least one predefined criterion, wherein the predefined criterion is used to analyze multiple money transfer routing schemes; receiving an indication of a source for a money transfer transaction; receiving an indication of a destination for the money transfer transaction; and determining multiple money transfer routing schemes. Each of the multiple money transfer routing schemes may include a route to transmit funds from the source for the money transfer transaction to the destination for the money transfer transaction. At least one internal money transfer routing scheme and at least one external money transfer routing scheme may be analyzed. An internal money transfer routing scheme may refer to a money transfer routing scheme that utilizes a direct money transfer arrangement between the destination of the money transfer transaction and the money transfer network. An external money transfer routing scheme may refer to a money transfer routing scheme that utilizes at least one third party money transfer network between the destination of the money transfer transaction and the money transfer network. The computer program product may also include for analyzing multiple money transfer routing schemes; and identifying the preferable money transfer routing scheme at least partially based on the predefined criterion from among the analyzed multiple money transfer routing schemes.

DETAILED DESCRIPTION OF THE INVENTION

A third party financial network may be used to exchange funds between financial institutions, such as banks and/or money transfer service providers. In instances where two financial institutions use multiple different third party financial networks, more than one different third party financial network may be used for the financial transaction. Besides third party financial networks, the financial institutions may have a direct relationship through which the financial transaction may be conducted. In such a situation, a decision may need to be made as to how to route the funds of the financial transaction: via one of the third party financial networks or via the direct relationship. There are several factors which may be evaluated. Speed may be one factor. While one form of money transfer may guarantee funds are transferred within a day, the other form of funds transfer may result in a substantially longer (e.g., several days) or smaller (e.g., near real time) period of time. Cost may be another factor. While one form of money transfer may cost very little for a financial institution to conduct, another form of money transfer may cost several times more.

One situation where multiple options for routing a financial transaction, such as a money transfer transaction, may be present is an international money transfer transaction to an account held by a bank located in another country. The financial institution that holds the source of the funds (e.g., the source) may have a relationship with the bank (or other financial institution) holding the account that is serving as the destination of the funds (e.g., the destination). Additionally, the source may be able to send a money transfer to the destination through one or more third party financial networks. Before the money transfer is conducted, multiple money transfer routing schemes may be evaluated that utilize the various direct connections or third party financial networks available to determine which is preferable for the money transfer transaction. The preferable money transfer routing scheme from among the available money transfer routing schemes may be determined based on one or more predefined criteria. An example of a predefined criterion may be to always use the least expensive money transfer routing scheme as long as the transaction will complete in less than three days. In some embodiments, a customer, who may be either receiving or sending the funds of the money transfer transaction, may select the preferable routing scheme from the available routing schemes based on the customer's preference (e.g., as quick as possible, as cheap as possible, as reliably as possible, etc.).

Whether the customer selects the preferable routing scheme or the preferable routing scheme is determined by the money transfer system according to predefined criteria, the money transfer transaction may be completed using the preferable money transfer routing scheme.

Figure 1:
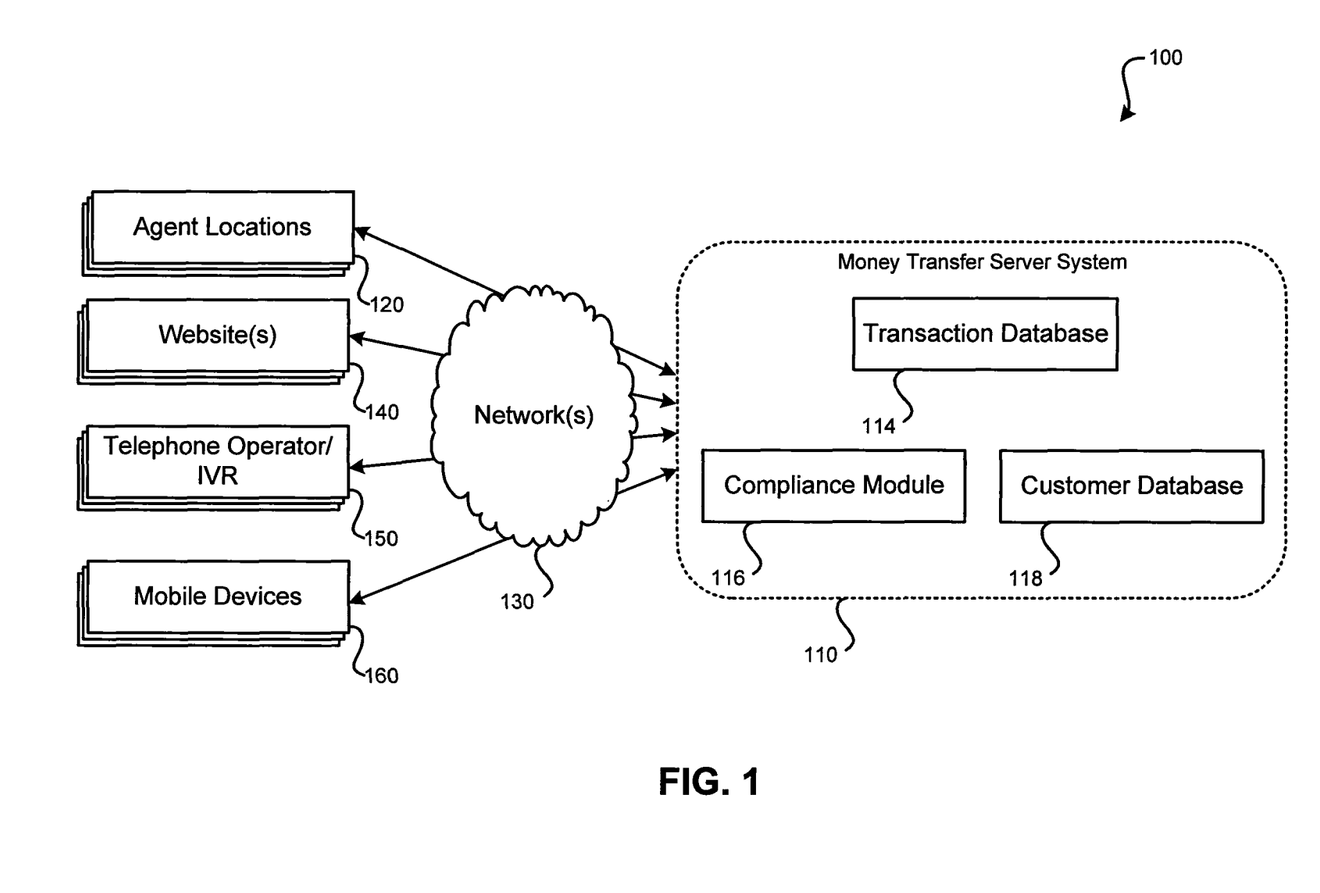
FIG. 1 illustrates a simplified block diagram of an embodiment of a money transfer system.

To implement such routing of money transfer transactions, a money transfer system may be used. FIG. 1 illustrates a simplified embodiment of a money transfer system 100. Such a money transfer system may be operated by an entity such as WESTERN UNION and may be capable of performing a variety of money transfer transactions from payors to payees. For example, money transfer system 100 may be capable of performing wire transfers, money transfers, and/or bill payment transactions. Other services may include the ability to issue and reload prepaid stored value cards with funds, and the ability to send gift cards to a party (and reload such cards with funds). A wire transfer may be made from one party to another party, and may involve cash being transferred. Money transfer system 100 may include one or more agent locations 120, one or more websites 140, telephone operator and/or interactive voice response (IVR) systems 150, mobile devices 160, a money transfer server system 110, a transaction database 114, a compliance module 116, and/or a customer database 118.

Agent locations 120 may represent various kiosks and/or other physical locations where payors and payees may conduct money transfer transactions. For example, WESTERN UNION may have hundreds of thousands of agent locations scattered worldwide. At agent locations 120, a person, such as a clerk, may serve as a representative of the entity providing the money transfer service. Payors and payees may conduct money transfer transactions by interacting directly with an agent of the money transfer entity at an agent location. Transactions conducted at an agent location may be conducted using a variety of different payment methods. For example, cash, checks, credit cards, debit cards, and stored value cards are all possible methods through which a payment may be received from a payor or provided to a payee. Also, at an agent location, payors and payees may interact directly with a kiosk that is part of the money transfer system 100. Alternatively, the agent of the money transfer service provider may interact with the kiosk on behalf of the payor or payee.

Money transfer system 100 may include one or more websites. Such websites may allow payors and payees to conduct money transfer transactions via the Internet. A payor may provide payment and transaction information to money transfer system 100 via website 140. For example, a payor may provide bank account information or credit card information to money transfer system 100 via website 140. Likewise, payees may receive payment sent via money transfer system 100 via website 140. For example, it may be possible for a payee to provide a bank account number for funds to be deposited via website 140. Website 140 may also permit a payor or payee to determine the status of a money transfer transaction. If a payor is conducting the money transfer using a bank account, credit card, stored value card, or using some other payment method besides cash, he may be able to conduct the entire payor-side transaction using the website 140. Likewise, if the payee is receiving the funds via a method other than cash, he may be able to complete his payee-side transaction using website 140. Alternatively, if either the payor and payee is conducting the transaction in cash, some of the information necessary to conduct the money transfer transaction may be supplied via website 140, with the cash being transacted at an agent location of agent locations 120.

Money transfer system 100 may also include a telephone operator and/or interactive voice response (IVR) system 150. Telephone operator and/or IVR system 150 may allow a payor and/or payee to conduct the money transfer transaction via a telephone call to the telephone operator and/or IVR system 150. Payors and payees may provide the information necessary to conduct the money transfer transaction via the telephone, either to a human operator, or to an interactive voice response system. If a payor is conducting the money transfer using a bank account, credit card, stored value card, or using some other payment method besides cash, he may be able to completely conduct the transaction using the telephone operator and/or IVR system 150. Likewise, if the payee is receiving the funds via a method other than cash, he may be able to complete the transaction using the telephone operator and/or IVR system 150. Alternatively, if either the payor and payee is conducting the transaction in cash, some of the information necessary to conduct the money transfer transaction may be supplied via the telephone operator and/or IVR system 150, with the cash being transacted at an agent location of agent locations 120.

Also, it may be possible to interact with money transfer system 100 via mobile devices 160. Mobile Device 160 may represent various wireless devices that can communicate with money transfer system 100. For example, Mobile Device 160 may include cellular telephones, smart phones, laptops, tablet computers, etc. Mobile devices 160 may load a website to interact with money transfer system 100. Alternatively, mobile devices 160 may run one or more pieces of software, such as applications or firmware configured to allow interaction with money transfer system 100. Via mobile devices 160, it may be possible for a payor to transmit funds to a payee. Also, it may be possible for a payee to receive funds via mobile devices 160. If a payor is conducting the money transfer using a bank account, credit card, stored value card, or using some other payment method besides cash, he may be able to complete the transaction using a mobile device of mobile devices 160. Likewise, if the payee is receiving the funds via a method other than cash, he may be able to complete the transaction using a mobile device of mobile devices 160. Alternatively, if either the payor or payee is conducting the transaction in cash, some of the information necessary to conduct the money transfer transaction may be supplied via a mobile device of mobile devices 160, with the cash being transacted at an agent location of agent locations 120.

Agent locations 120, website 140, telephone operator and/or IVR system 150, and mobile devices 160 may communicate with money transfer server system 110 via a network 130. Network 130 has been represented as a single network in FIG. 1. This is for simplicity only; network 130 may include several networks. Further, the network used for agent locations 120 to communicate with money transfer server system 110 may be different from the network used by mobile devices 160 to communicate with money transfer server system 110. The network 130 may include one or more public networks, such as the Internet, and one or more private networks, such as a corporate intranet. Further, multiple networks may be used to communicate with money transfer server system 110. For example, mobile devices 160 may use a wireless cellular provider's network and the Internet to communicate with money transfer server system 110.

Whether a payor provides funds to the money transfer system 100 via agent locations 120, website 140, telephone operator and/or IVR system 150, or mobile devices 160, this may not affect how a payee may receive the funds. For example, while a payor may provide funds via website 140, a payee may retrieve the funds via one of agent locations 120. It may also be possible for a payor to use the same entity, such as agent locations 120, to conduct a money transfer transaction.

Money transfer server system 110 may include one or more various subsystems used to conduct a money transfer transaction. For example, a customer database 118 may be present. Customer database 118 may store biographical information about the money transfer service provider's customers (payors and payees).

Transaction database 114 may store information on pending and completed money transfer transactions. Transaction database 114 may identify amounts of funds provided by payors, amounts of funds due to payees, payors' names, the payees' names, transaction identifiers such as money transfer control numbers (MTCNs), the locations where the transactions were initiated (e.g., the website, an address of the agent location), the location of where the transaction is expected to be completed (e.g., where the payee is expected to receive the funds), the payor's payment method (e.g., cash, credit card, money order, stored value card, check, etc.), and whether or not various money transfer transactions have been completed or are pending.

Compliance module 116 may be used to ensure compliance with government regulations. For example, the money transfer service provider operating the money transfer system 100 may be required to comply with various government regulations (possibly varying by country) intended to prevent fraudulent and/or illegal use of money transfer systems. An example of a compliance measure that the money transfer service provider may use is a list of persons that the money transfer service provider is prohibited from doing business with published by the Office of Foreign Asset Control (OFAC). The money transfer service provider may be required by law to not do business with persons (e.g., payors or payees) published on such a list. Other compliance measures may include gathering additional information about payors and payees conducting a money transfer that exceeds a particular amount and/or is international. Money transfer transactions being conducted with cash may also include additional compliance measures. Therefore, depending on the location of the payor and payee, the amount of the money transfer, and the payment method, each money transfer may be subject to varying levels of examination and regulation by compliance module 116.

Figure 2:
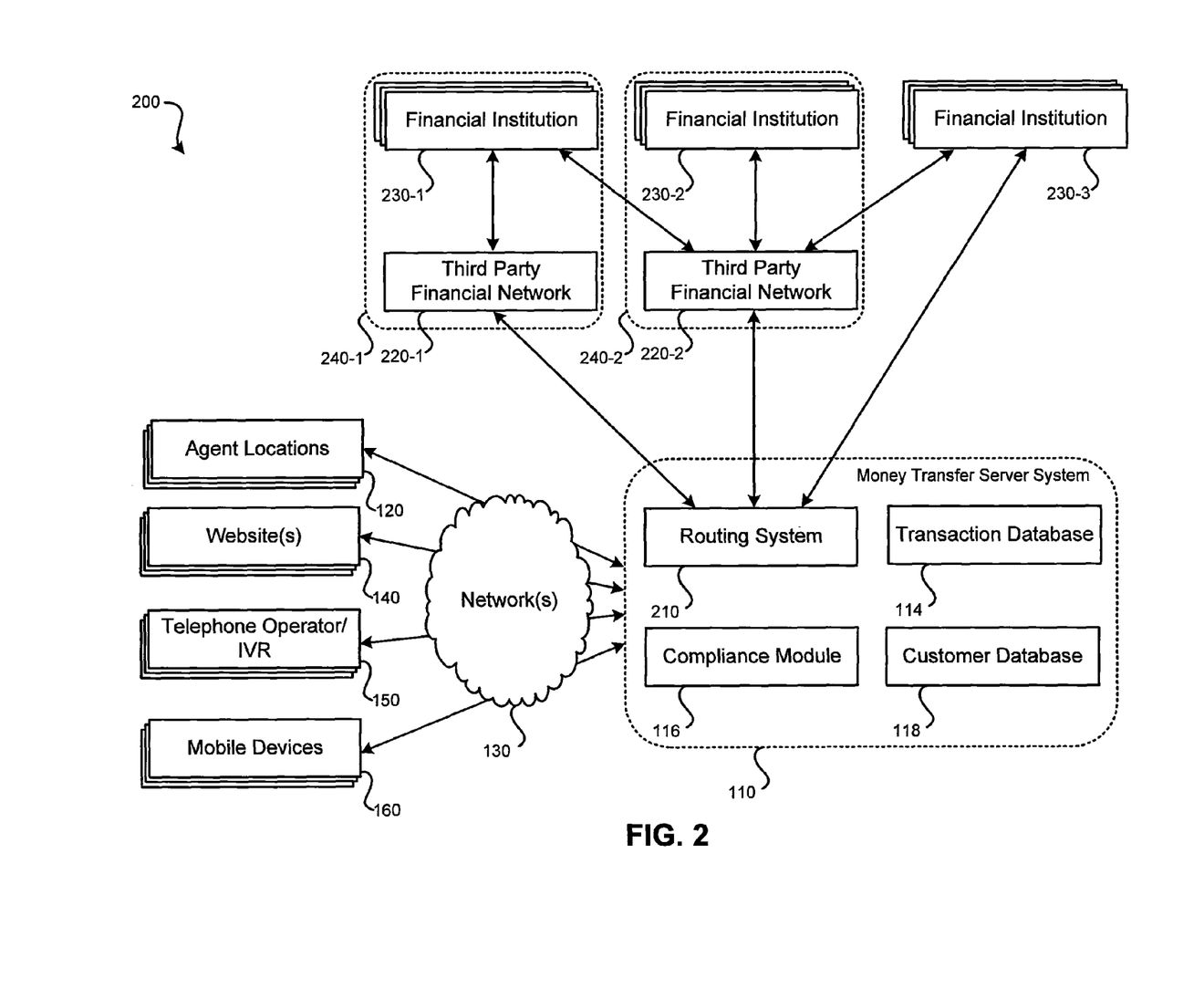
FIG. 2 illustrates a simplified block diagram of an embodiment of a money transfer system that interacts with multiple third party financial networks.

FIG. 2 illustrates a simplified block diagram of an embodiment of a money transfer system 200 that interacts with multiple third party financial networks. Money transfer system 200 of FIG. 2 may represent the same money transfer system of FIG. 1 or may represent some other money transfer system.

In addition to the various components of money transfer server system 110 described in relation to FIG. 1, money transfer server system 110 may also include routing system 210. Routing system 210 may identify, analyze, select, and/or execute money transfer routing schemes. Routing system 210, or some other component of money transfer server system 110, may communicate with one or more third party financial networks and one or more financial institutions. In the embodiment of FIG. 2, routing system 210 communicates with third party financial network 220-1 and third party financial network 220-2. Through third party financial network 220-1, routing system 210 may route a money transfer to financial institution 230-1. Through third party financial network 220-2, routing system 210 may route a money transfer to financial institution 230-1, financial institution 230-2, or financial institution 230-3. Routing system 210 also communicates directly with a financial institution, such as financial institution 230-3.

To be clear, a third party financial network refers to a financial network not operated by the entity that operates money transfer server system 110. The third party financial network may be operated by some other financial institution or by some other third party entity. Third party financial networks may allow financial institutions that do not have a pre-existing relationship to conduct money transfers or other financial transactions between them. Examples of third party financial networks may include the automated clearing house network (ACH), electronic payments network (EPN), or interbank networks, such as PLUS, NYCE, and MAC in North America, Banklink, StarNet, and Euronet in Europe, and Midas in the Caribbean. As those with skill in the art will recognize, various other third party financial networks exist for sending funds within a country and internationally.

A financial institution may refer to a bank, a money transfer service provider (such as WESTERN UNION), and/or any other form of financial institution that provides financial services that include money transfers. Such financial institutions may provide money transfer services within a country and/or internationally.

Routing system 210 may refer to a system that identifies, evaluates, and/or routes money transfer transactions to other financial institutions either directly or via a third party financial network. Money transfer transactions that have various money transfer routing schemes identified, evaluated, and/or routed by routing system 210 may be initiated using any of the interfaces of FIG. 1 or FIG. 2, such as agent locations 120, website(s) 140, telephone operator/IVR system 150, or mobile devices 160.

FIG. 2 illustrates how routing system 210 of money transfer server system 110 may communicate, both directly and indirectly, with financial institutions 230. Referring first to financial institution 230-1, routing system 210 may use third party financial network 220-1 to communicate with it. This may be because the entity operating money transfer server system 110, referred to as the money transfer service provider, does not have a relationship directly with financial institution 230-1. A money transfer routed to financial institution 230-1 using a third party financial network may be referred to as conducting a money transfer using an external money transfer routing scheme. Routing system 210 may also communicate with financial institution 230-1 through third party financial network 220-2. Therefore, routing system 210 may identify two money transfer routing schemes: one using third party financial network 220-1 and one using third party financial network 220-2. Because both of these money transfer routing schemes use a third party financial network, both would be referred to as external money transfer routing schemes. This situation may arise when both the money transfer service provider and financial institution 230-1 utilize two of the same third party financial networks.

Referring next to financial institution 230-2, routing system 210 may use third party financial network 220-2 to communicate with it. As third party financial network 220-2 is the only third party financial network present that communicates with financial institution 230-2 and no direct connection between routing system 210 and financial institution 230-2 exists, routing system 210 may not have any options to choose between for routing funds to financial institution 230-2. When a third-party financial network is used to conduct a money transfer transaction between routing system 210 and a financial institution, it may be referred to as an external money transfer transaction. In system 200, financial institution 230-1 and financial institution 230-2 are in different geographical regions. Financial institution 230-1 is located in the first country 240-1. Third party financial network 220-1 may also operate in or operate exclusively in first country 240-1. Financial institution 230-2 may be located in second country 240-2. Third party financial network 220-2 may also operate in or operate exclusively in second country 240-2. Of course, third party financial networks 220 may operate in several different countries. Further, while third party financial network 220-2 may operate from country 240-2 it may also communicate with financial institution 230-1 located in first country 240-1.

Routing system 210 may communicate directly with financial institution 230-3. Such direct communication may indicate that the money transfer service provider operating money transfer server system 110, including routing system 210, has an arrangement with financial institution 230-3 to allow the two institutions to communicate directly without the need for third-party financial network to conduct financial transactions such as money transfer transactions. When a money transfer transaction is conducted using direct communication between routing system 210 and a financial institution (without the use of a third party financial network), it may be referred to as an internal money transfer routing scheme. Besides the direct communication between routing system 210 and financial institution 230-3, routing system 210 may also communicate with financial institution 230-3 via third-party financial network 220-2. Therefore, in conducting a money transfer from routing system 210 to financial institution 230-3, routing system 210 may select between an internal money transfer routing scheme and an external money transfer routing scheme.

To be clear, direct communication does not imply that a network is not used; rather it means that no third-party financial network is used in communication. While a network is only shown for communication between interfaces 120, 140, 150, 160 and money transfer server system 110, it should be understood that one or more networks may be used to communicate between routing system 210 and third-party financial networks 220. Similarly, one or more networks may be used to communicate between third-party financial networks 220 and financial institutions 230.

While system 200 illustrates three financial institutions and two third-party financial networks, it should be understood that routing system 210 may communicate with many more different third-party financial networks and many more different financial institutions. It should further be understood that each third-party financial network may communicate with many different financial institutions. Further, there may be either none, some, or significant overlap between the financial institutions communicated with by the various third-party financial networks. For example, routing system 210 may have a choice of two, five, or even ten different third-party financial networks to communicate with a specific financial institution.

Whether a third-party financial network communicates with the particular financial institution may be governed by whether that finance institution and the third-party financial network have an existing service agreement. Similarly, whether a financial institution communicates directly with routing system 210 without the use of a third-party financial network may be governed by whether that financial institution and the money transfer service provider operating routing system 210 have a service agreement.

Figure 3:
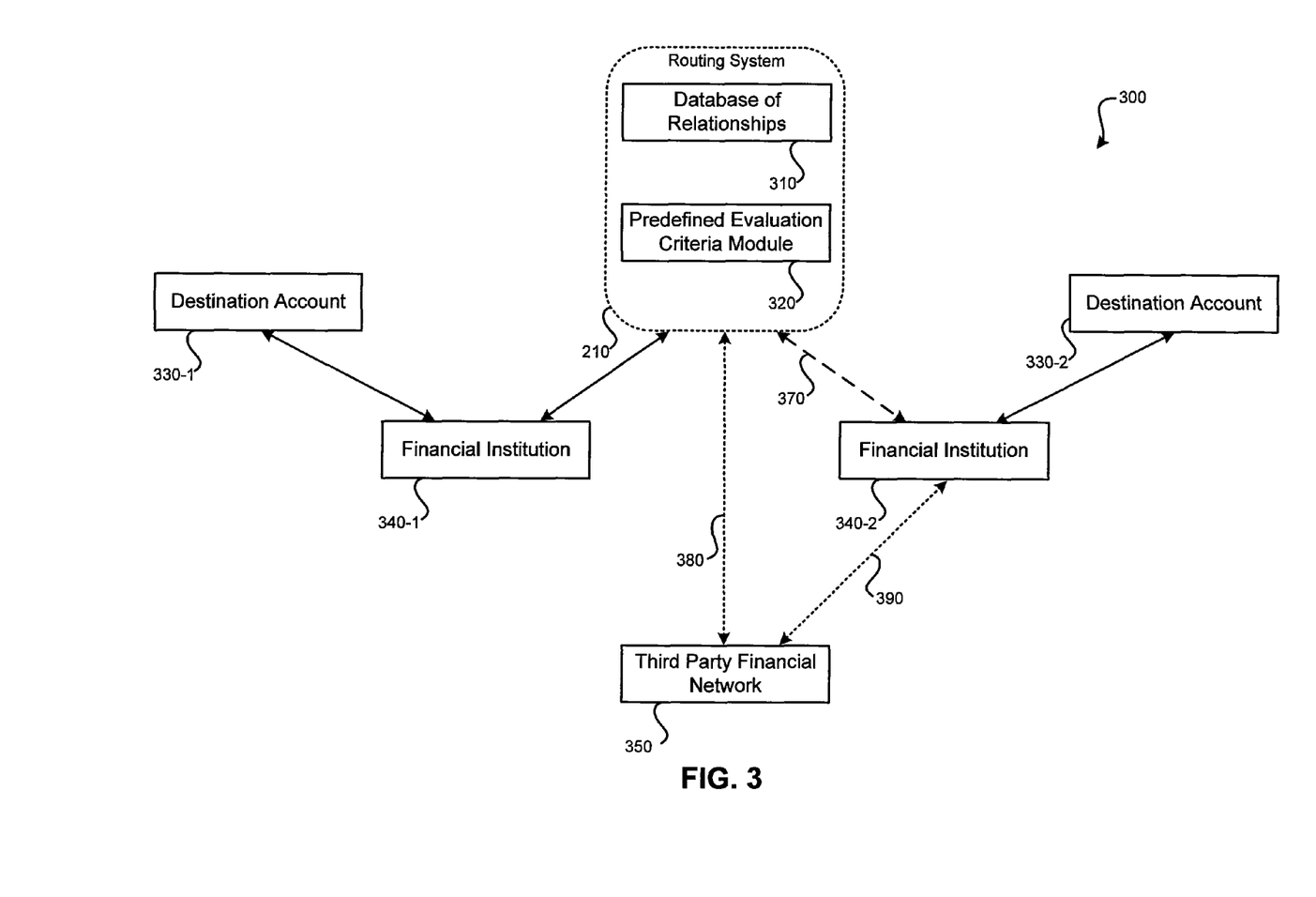
FIG. 3 illustrates a simplified block diagram of an embodiment of a routing system of a money transfer system utilizing various internal and external money transfer routing schemes to conduct a money transfer transaction.

FIG. 3 illustrates an embodiment of a system 300 that includes a routing system of a money transfer system to utilize various money transfer routing schemes. Routing system 210 may represent routing system 210 of FIG. 2. Alternatively, routing system 210 may represent some other routing system.

Routing system 210 may include multiple components. For example, routing system 210 may include a database of relationships 310 and a predefined evaluation criteria module 320. Database of relationships 310 may store a listing of financial institutions and third-party financial networks which the money transfer service provider that operates routing system 210 has relationships with. Database of relationships 310 may store indications of each way with which routing system 210 may communicate with a particular financial institution. For example, a particular financial institution may contain one or more entries within database of relationships 310. One of these entries may indicate that routing system 210 may communicate directly with that particular financial institution. Another entry may indicate that a certain third-party financial network may be used to send a money transfer to that financial institution. Further indication of what financial institutions may be communicated with via that third-party financial network may be stored in database of relationships 310. Database of relationships 310 may also include information regarding the fees, guarantees provided, and/or an amount of time necessary to conduct a transaction with the associated financial institution and/or third party financial network appearing in database of relationships 310. Table 1 illustrates a simplified embodiment of a handful of entries that may appear in database of relationships 310. As those of skill in the art will recognize, the information presented in Table 1 may be stored in various different ways and Table 1 is not restrictive as to what particular data may be represented and stored in database of relationships 310.

TABLE 1

| Financial Institution | Internal/External/3rd Party Network | Time | Cost | Guarantee |
|---|---|---|---|---|
| Bank of Bangladesh | External - TransAsia Network | 2 days | 1.5% | Yes |
| | Internal | 1 day | 0.4% + $10 USD | No |
| Bank of Namibia | External - AfricaNET | 3 days | 1.1% + $5 USD | No |
| | External - SARouter | 2 days | 3% | Partial |

Table 1, which may represent a portion of database of relationships 310, indicates two financial institutions, for each of which routing system 210 has two routing schemes available for money transfers involving the financial institutions. In Table 1, routing system 210 has two possible money transfer routing schemes for financial transactions involving the Bank of Bangladesh. The first money transfer routing scheme is an external money transfer routing scheme using a third-party financial network called "TransAsia." A money transfer conducted to the Bank of Bangladesh using this third-party network takes two days and costs 1.5% of the amount being transferred. Some or all of this cost may be due to either the third-party network and/or the financial institution that the money is being transferred to. In this instance, the third-party network guarantees the success of the transaction. The second money transfer routing scheme that may be used for financial transaction with the Bank of Bangladesh is an internal money transfer routing scheme. Therefore, an agreement or relationship between the money transfer service provider operating routing system 210 and Bank of Bangladesh may exist. This example of a money transfer transaction takes one day to complete and costs 0.4% plus a fixed fee of $10 in United States dollars. There may be no guarantee on the money transfer transaction because there is no third-party financial network involved to provide such a guarantee. In the second portion of Table 1, financial transactions involving the Bank of Namibia may involve a selection between two different external money transfer routing schemes. As shown in Table 1, the amount of time, cost, and/or guarantee may vary based on which third-party financial network is selected. It should also be understood that more than one third-party financial network may be used for money transfer transactions. For example, a first third-party financial network may communicate with a second third-party financial network which may then, in turn, communicate with the destination financial institution. As should be understood, the information presented in Table 1 is merely for exemplary purposes and is not meant to represent real world relationships, costs, and/or guarantees. Further, while two money transfer routing schemes are shown for each of the financial institutions of Table 1, fewer or more money transfer routing schemes, both external and/or internal, may be present.

Database of relationships 310 may be updated periodically to keep all relationships, and the information associated with those relationships, up to date. This may be performed by an agent of the money transfer service provider operating routing system 210. In some embodiments, routing system 210 may have access to one or more databases that contain information that may be used to update database of relationships 310.

In addition to routing system 210 having a database of relationships 310, routing system 210 may have a predefined evaluation criteria module 320. Predefined evaluation criteria module 320 may contain one or more criteria that are used by routing system to determine which available money transfer routing scheme, be it internal or external, should be used to complete a money transfer transaction. These criteria may evaluate cost, time, and/or other criteria such as an available guarantee. As an example, the criteria may specify that the least expensive routing scheme should be used as long as the transaction will complete in two or fewer days. As another example, the criteria may specify that the least expensive routing scheme should be used. Which routing scheme is the least expensive may vary depending on the amount of money sent via the money transfer transaction due to fixed fees and/or percentages of the transaction amount being charged. In some situations, a criterion may specify that the fastest routing scheme should be used. While these exemplary criteria are simple, it should be understood that the criteria used to evaluate which money transfer routing scheme should be used in a particular situation may be more complicated.

In FIG. 3, routing system 210 has only one option for communicating with financial institution 340-1. This money transfer routing scheme is internal, as it does not use any third-party financial network. As such, predefined evaluation criteria may not be applied to this relationship because alternatives are not available. Whatever amount of funds is being transferred from routing system 210 via a money transfer transaction to an account at financial institution 340-1, the money transfer transaction may include an indication of an account in which to deposit the funds. After transmitting the funds to financial institution 340-1, financial institution 340-1 may deposit the funds associated with the money transfer transaction, possibly minus some fee, to destination account 330-1. The account number of destination account 330-1 may have been specified by the person conducting the money transfer transaction via the money transfer service provider operating routing system 210.

If a money transfer is intended for destination account 330-2 of financial institution 340-2, multiple money transfer routing schemes may be present. The first money transfer routing scheme may be internal, represented by link 370. The second money transfer routing scheme may be external, using third-party financial network 350, and links 380 and 390. In this instance, predefined evaluation criteria module 320 may be used to determine which money transfer routing scheme should be used to transfer the funds to destination account 330-2. While it may be possible that the internal or the external money transfer routing scheme is always preferable, which is preferable may vary based on the amount of funds, and/or the amount of time necessary for the money transfer transaction to occur. Further, in some embodiments, either the person sending the funds or the person receiving the funds, who may be the account owner of the destination account, may be able to specify various parameters. For example, the person receiving the funds may specify that they wish the money transfer transaction to complete in one day (or less). For this, the person receiving the funds may be willing to pay an additional and/or a higher fee. Alternatively, if the person receiving the funds is not in a hurry for the money transfer transaction to complete, he may be able to save money by allowing the money transfer transaction to be routed differently, which may take a longer period of time but may have lower fees associated with that particular money transfer routing scheme.

Figure 4:
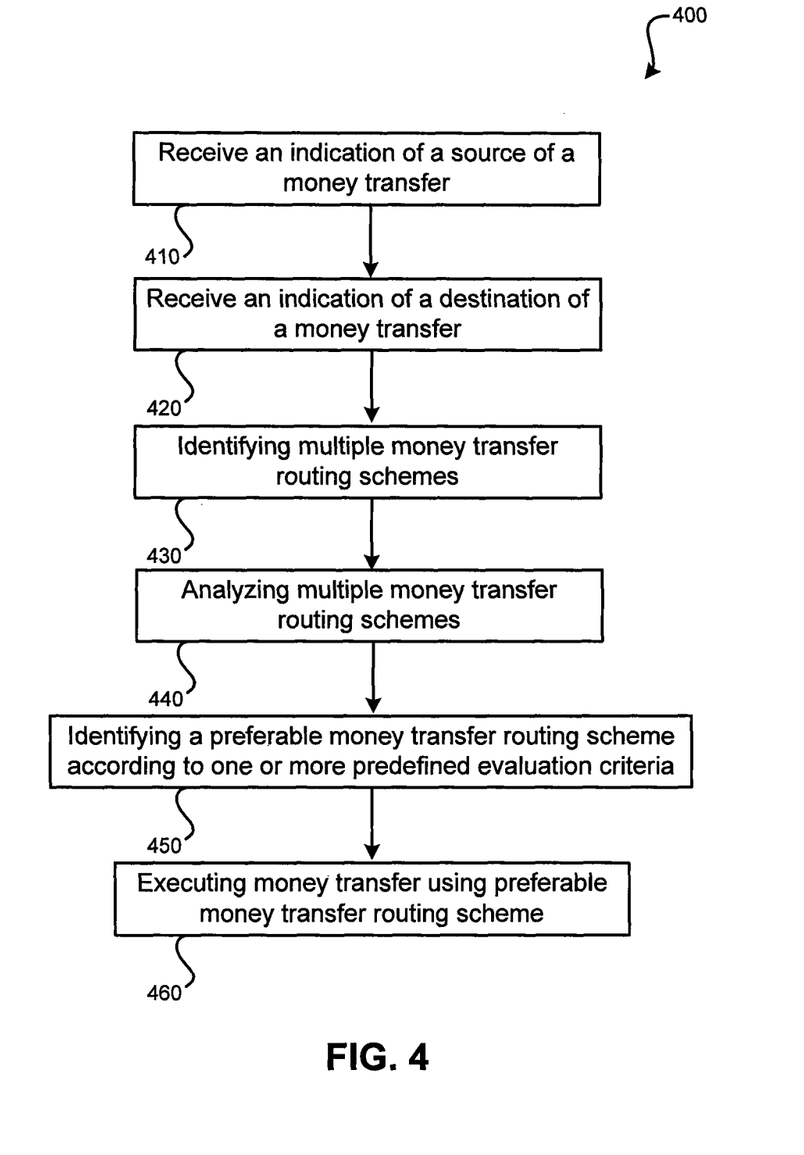
FIG. 4 illustrates a method for identifying, selecting, and executing a preferable money transfer scheme.

Various methods may be performed using the systems described in FIGS. 1-3. FIG. 4 illustrates a method 400 for identifying, selecting, and executing a preferable money transfer scheme. The method 400 may be performed using the systems described in FIGS. 1-3. Alternatively, method 400 may be performed using some other form of a money transfer system.

At block 410, an indication of a source of the money transfer may be received by a money transfer system. The indication of the source of the money transfer may be received via any of the interfaces discussed in relation to FIGS. 1 and 2, such as agent locations 120, websites 140, telephone operator/IVR system 150, or mobile devices 160. The indication of the source of the money transfer may be provided by a person or an entity that desires to transfer money to some other person or entity, either within the same country or internationally. In addition to providing an indication of the source of the money transfer, the person or entity initiating the money transfer transaction may provide, an amount of funds to be transferred, biographical information about themselves, and/or information about the destination account of the funds or the person receiving the funds. In some embodiments, no or almost no information about the person receiving the funds may be provided. In such instances, the person or entity sending the funds may be provided with an identifier, such as a money transfer control number, which he may then provide to the person or entity that is to receive the funds. As such, when the money transfer transaction is initiated by the person or entity sending the funds, the money transfer service provider may have little or no information regarding the person or entity receiving funds.

At block 420, the money transfer system may receive an indication of a destination of the money transfer. The destination may be a bank account held by a financial institution, such as a bank. The destination may also be an agent location of a money transfer service provider. The information regarding the destination of the money transfer may be provided by the person or entity sending the funds or the person or entity receiving the funds. This information may include the name of the bank or other financial entity and/or the account number where the funds are to be deposited. If the information is provided by the person or entity receiving the funds, they may be required to provide an identifier of the money transfer transaction, such as a money transfer control number (MTCN). Additionally, the person or entity receiving the funds may be required to provide biographical information and/or additional information regarding the destination of the funds. In some instances, the indication of the destination of the money transfer may not be provided directly to the money transfer service provider. Rather, the person or entity receiving the funds may provide an indication of the money transfer, such as a money transfer control number, to a bank or other financial entity that holds the account where the person or entity receiving the funds wants the money transfer deposited. This bank or other financial entity may then, in turn, provide the money transfer control number or other identifier to the money transfer service provider.

At block 430, now that the money transfer service provider has an indication of the source and the destination of the money transfer, multiple money transfer routing schemes may be identified. These multiple money transfer routing schemes may include external money transfer routing schemes, internal money transfer routing schemes, or both. The multiple money transfer routing schemes may be identified by a routing system, such as routing system 210 of FIGS. 2 and 3. Such a routing system may employ the use of a database of relationships to identify the possible money transfer routing schemes to route money from the source of the money transfer to the destination of the money transfer. If only one money transfer routing scheme exists, further analysis of the money transfer routing scheme may not be necessary. In such an instance, the one money transfer routing scheme may be treated as the preferable money transfer routing scheme. However, if two or more money transfer routing schemes (whether internal and/or external) are present, further analysis may be necessary to determine which of these money transfer routing schemes is the preferable money transfer routing scheme.

At block 440, the multiple money transfer routing schemes may be analyzed. This analysis may be conducted by the routing system of the money transfer service provider. This may involve the multiple money transfer routing schemes being analyzed according to one or more predefined criteria. In such an embodiment, the person or entity sending the funds and/or the person or entity receiving the funds may not have the ability to select the money transfer routing scheme. Rather, the routing system of the money transfer service provider may select what it determines, according to the one or more predefined evaluation criteria, as the preferable money transfer routing scheme. At block 450, the preferable money transfer routing scheme according to the one or more predefined evaluation criteria may be identified. The preferable money transfer routing scheme may be identified by the routing system of the money transfer service provider.

At block 460, the money transfer may then be executed such that the funds are transferred from the source of the money transfer to the destination of the money transfer using the preferable money transfer routing scheme. Therefore, depending on which money transfer routing scheme has been identified as the preferable money transfer routing scheme according to the predefined evaluation criteria, the money transfer transaction may be either internal or external. A fee may be assessed to the funds of the money transfer transaction to cover the cost of the preferable money transfer routing scheme. In some embodiments, the fee is charged to either the person or entity sending the funds or the person or entity receiving the funds separate from the amount of funds being transferred via the money transfer transaction.

Figure 5:
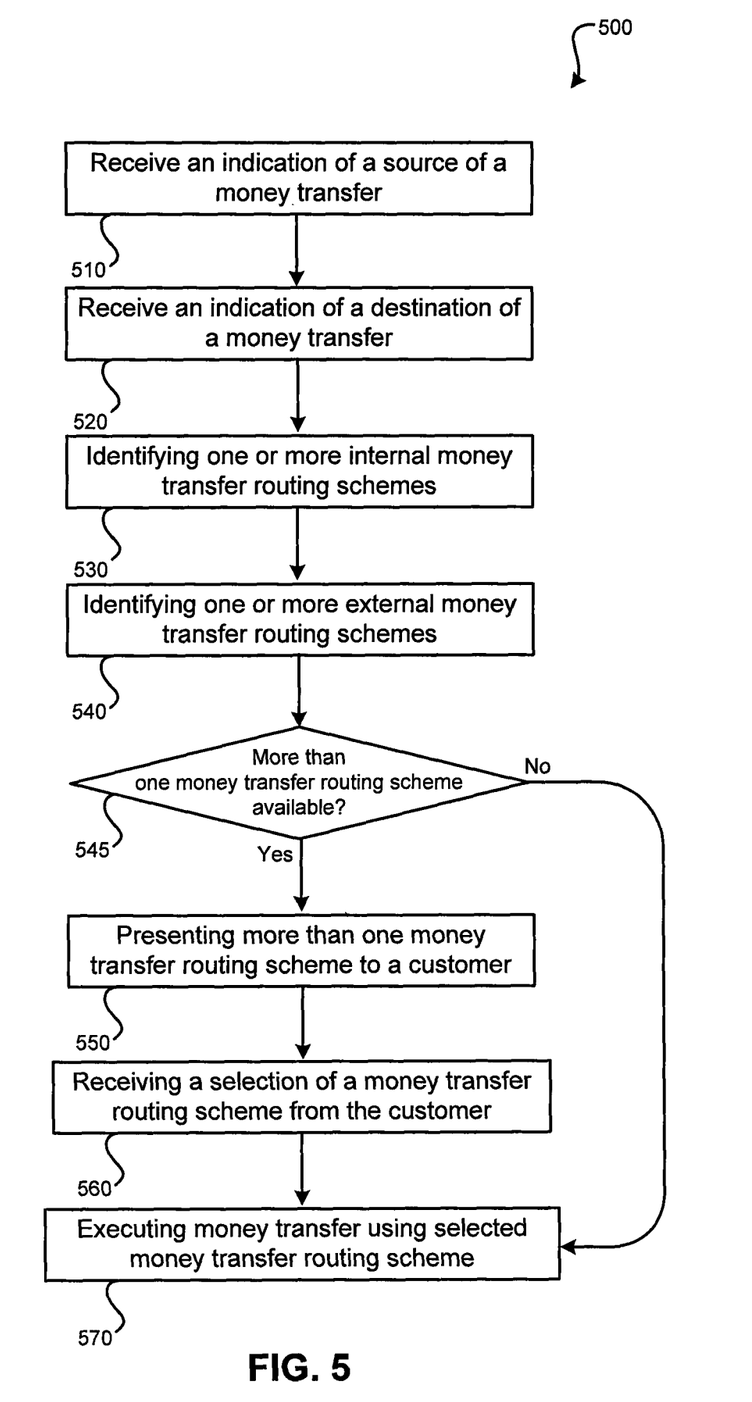
FIG. 5 illustrates a method for identifying, receiving a selection of a preferable money transfer routing scheme from a customer, and executing the selected money transfer scheme.

FIG. 5 illustrates a method 500 for identifying, selecting, and executing a preferable money transfer scheme. The method 500 may be performed using the systems described in FIGS. 1-3. Alternatively, method 500 may be performed using some other form of a money transfer system.

At block 510, indication of the source of the money transfer may be received by the money transfer service provider. Block 510 may be performed similarly to block 410 of the method 400 of FIG. 4. At block 520, an indication of the destination of the money transfer may be received by the money transfer service provider. Again here, block 520 may be performed similarly to block 420 of the method 400.

At block 530, one or more internal money transfer routing schemes that may be used to route money from the source of the money transfer to the destination the money transfer may be identified. In many instances, if an internal money transfer routing scheme exists, it is the only available internal money transfer routing scheme. The identification of the one or more money transfer routing schemes may be performed by a routing system, such as routing system 210 of FIGS. 2 and 3. Such a routing system may use a database of relationships such as database of relationships 310 of FIG. 3. If no internal money transfer routing schemes are present, the method may proceed to block 540.

At block 540, one or more external money transfer routing schemes that may be used to route money from the source of the money transfer to the destination of the money transfer may be identified. As with the internal money transfer routing schemes, the identification of the one or more external transfer routing schemes may be performed by a routing system, such as routing system 210 of FIGS. 2 and 3. Again here, such a routing system may use a database of relationships such as database of relationships 310 of FIG. 3. As is the case in method 400, block 530 and block 540 may be performed as one step or as separate steps. While an external money transfer routing scheme may involve the use of one third-party financial network, it should be understood that two or more financial networks may also be used in an external money transfer routing scheme. In such an arrangement, as an example, a first third-party financial network may route the money transfer transaction to another third-party financial network. If no external money transfer routing schemes are present, method 500 may proceed to block 550.

At block 545, it may be determined whether more than one money transfer routing scheme is available. This may include the internal money transfer routing schemes and the external money routing schemes identified at block 530 and 540, respectively. If more than one money transfer routing scheme is available, the method may proceed to block 550. Otherwise, the method may proceed to block 570.

At block 550, rather than the routing system of the money transfer service provider determining which is the preferable money transfer routing scheme, a customer may be presented with the various internal money transfer routing schemes and external money transfer routing schemes identified at block 530 and 540, respectively. The customer may be either the person or entity sending the money transfer transaction or the person or entity receiving the money transfer transaction. The available money transfer routing schemes may be presented to the customer by the money transfer service provider via any of the interfaces discussed in relation to FIGS. 1 and 2, such as agent locations 120, website 140, telephone operator/IVR system 150, or mobile devices 160. Alternatively, if the customer is the person or entity receiving the funds, the available money transfer routing schemes may be presented to the customer via the financial entity through which the customers receive the funds.

Figure 6:
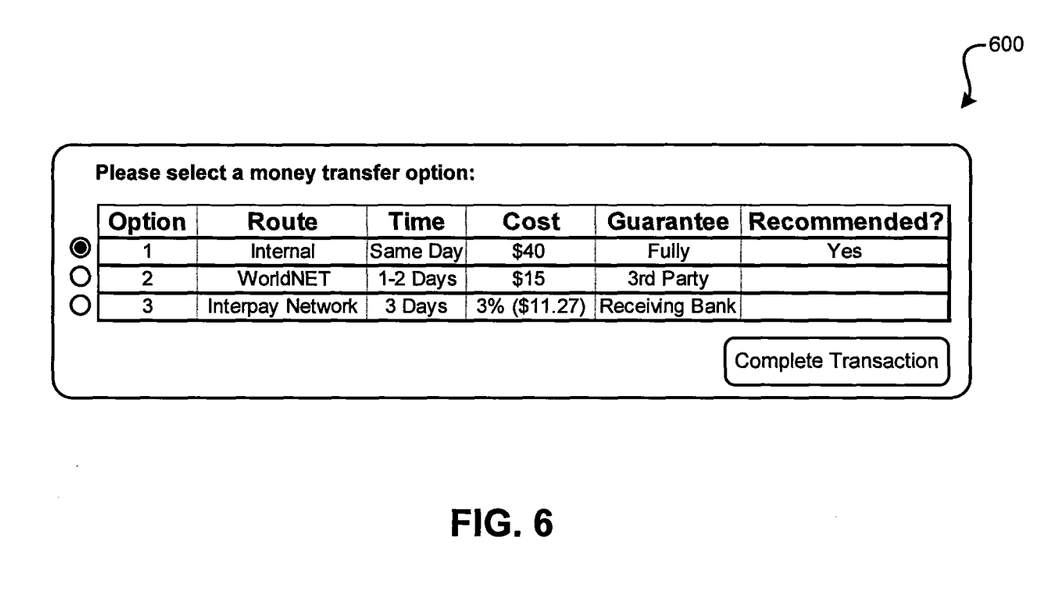
FIG. 6 illustrates a selection window a customer may use to select a money transfer scheme.

FIG. 6 illustrates an embodiment of a selection window 600 that may be presented to the customer to allow him to select the money transfer routing scheme that the customer wishes to conduct the money transfer through. Such a selection window may be presented to the customer via a kiosk at an agent location, via website of the money transfer service provider, or on a mobile device of the customer, such as a smart phone. If the customer is interacting via the telephone operator/IVR system, the options may be spoken to the customer. Alternatively, if the customer is the person or entity receiving the funds, he may be presented with such a selection window by the financial entity through which he is receiving the funds. Such a selection window may present the customer with some or all of the money transfer routing schemes identified at blocks 530 and 540. Each of the money transfer routing schemes may indicate whether they are internal or external. If the money transfer routing scheme is external, it may indicate the third-party financial network that the money transfer routing scheme utilizes. The selection window may also indicate the amount of time each money transfer routing scheme takes to execute. The cost of each money transfer routing scheme may also be indicated. If the cost of a particular money transfer routing scheme is a percentage of the money transfer transaction, the percentage may be displayed to the customer or the percentage may be used to calculate the actual cost to the customer. Further, the customer may be given the option of subtracting the cost from the money transfer amount or paying the costs in addition to the money transfer amount. The selection window may also indicate whether each money transfer routing scheme is guaranteed by any of the parties involved in the transaction. Finally, to encourage the customer to select a particular money transfer routing scheme, the transaction window may include one or more recommendations to the customer. The recommendation may be the money transfer routing scheme the routing system would have selected. Once the customer has selected one of the money transfer routing schemes, the customer may click a button to confirm that he wishes to complete the transaction via the selected money transfer routing scheme.

Returning to FIG. 5, the selection of the money transfer routing scheme from the customer may be received at block 560. As discussed in relation to FIG. 6, this may involve a customer clicking a button to confirm that he wishes to complete the transaction via a selected money transfer routing scheme. While FIG. 6 illustrates one possible way of a customer selecting a money transfer routing scheme, those with skill in the art will recognize that others may be possible. For example, the customer may be presented with options telephonically. In some embodiments, an agent of the money transfer service provider, or the financial entity through which the customer may be receiving the funds could verbally or visually present the customer with the options.

At block 570, the money transfer transaction may be executed to transfer the funds from the source of the money transfer to the destination of the money transfer using the selected money transfer routing scheme.

Figure 7:
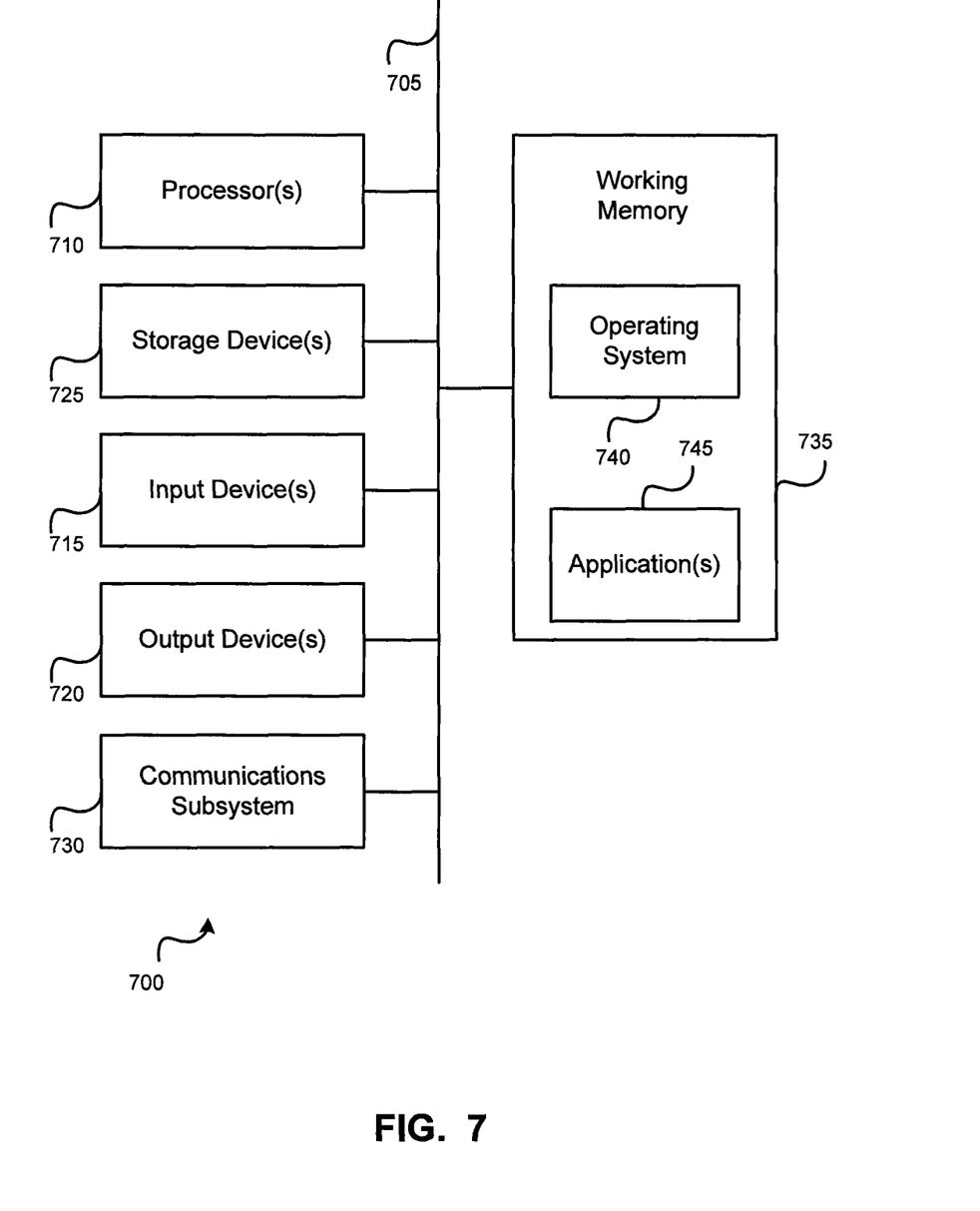
FIG. 7 illustrates a simplified embodiment of a computer system.

To perform the actions of the money transfer system, the various components of the money transfer system, the routing system, or any other previously mentioned computing devices, a computer system as illustrated in FIG. 7 may be used. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, and/or a computer system. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as the system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, while the preceding description details money transfer transactions, it should be understood that similar systems and methods may be used to perform other forms of financial transactions. For example, similar arrangements may be used to conduct bill payment, etc.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for analyzing multiple money transfer routing schemes to identify a preferable money transfer routing scheme from among the multiple money transfer routing schemes according to at least one predefined criterion, the method comprising:
   receiving, by a computer system of a money transfer network, at least one predefined criterion, wherein the predefined criterion is used to analyze multiple money transfer routing schemes;
   receiving, by the computer system, an indication of a source for a money transfer transaction;
   receiving, by the computer system, an indication of a destination for the money transfer transaction;
   selecting, by the computer system, multiple money transfer routing schemes, wherein:
      each of the selected multiple money transfer routing schemes comprises a route to transmit funds from the source for the money transfer transaction to the destination for the money transfer transaction;
      at least one internal money transfer routing scheme and at least one external money transfer routing scheme are selected;
      an internal money transfer routing scheme refers to a money transfer routing scheme that utilizes a direct money transfer arrangement between the destination of the money transfer transaction and the money transfer network; and
      an external money transfer routing scheme refers to a money transfer routing scheme that utilizes at least one third party money transfer network between the destination of the money transfer transaction and the money transfer network;
   analyzing, by the computer system, the selected multiple money transfer routing schemes;
   identifying, by the computer system, the preferable money transfer routing scheme at least partially based on the predefined criterion from among the analyzed multiple money transfer routing schemes;
   causing, with the computer system, at least a subset of the selected multiple money transfer routing schemes to be presented at a user interface, wherein the subset includes the preferable money transfer routing scheme and at least one other money transfer routing scheme; and
   receiving from the user interface, by the computer system, an instruction to implement a particular money transfer routing scheme from among the subset of the selected multiple money transfer routing schemes.

2. The method of claim 1, wherein the multiple money transfer routing schemes relate to international money transfer routing schemes and the preferable money transfer routing scheme is an international money transfer routing scheme.

3. The method of claim 1, wherein the preferable money transfer routing scheme is an internal money transfer routing scheme.

4. The method of claim 1, wherein the preferable money transfer routing scheme is an external money transfer routing scheme.

5. The method of claim 1, wherein the predefined criterion is used to identify the preferable money transfer routing scheme according to a maximized amount of profitability of the money transfer transaction for the money transfer network.

6. The method of claim 1, wherein the predefined criterion is used to identify the preferable money transfer routing scheme according to a minimized amount of time to execute the money transfer transaction.

7. The method of claim 1, further comprising routing, by the computer system, the money transfer transaction from the source to the destination according to the preferable money transfer routing scheme.

8. The method of claim 1, wherein causing at least a subset of the selected multiple money transfer routing schemes to be presented at a user interface comprises causing the user interface to indicate which of the subset of the selected multiple money transfer routing schemes is the preferable money transfer routing scheme.

9. The method of claim 1, wherein causing at least a subset of the selected multiple money transfer routing schemes to be presented at a user interface comprises a selection from a group consisting of:
audibly presenting the subset of the selected multiple money transfer routing schemes; and
visually presenting the subset of the selected multiple money transfer routing schemes.

10. A system for analyzing multiple money transfer routing schemes to identify a preferable money transfer routing scheme from among the multiple money transfer routing schemes according to at least one predefined criterion, the system comprising:
a money transfer computer system comprising a routing computer system configured to:
communicate with multiple external money transfer computer systems;
receive at least one predefined criterion, wherein the predefined criterion is used to analyze multiple money transfer routing schemes;
receive an indication of a source for a money transfer transaction;
receive an indication of a destination for the money transfer transaction;
select multiple money transfer routing schemes, wherein:
each of the selected multiple money transfer routing schemes comprises a route to transmit funds from the source for the money transfer transaction to the destination for the money transfer transaction;
at least one internal money transfer routing scheme and at least one external money transfer routing scheme are selected;
an internal money transfer routing scheme refers to a money transfer routing scheme that utilizes a direct money transfer arrangement between the destination of the money transfer transaction and the money transfer network; and
an external money transfer routing scheme refers to a money transfer routing scheme that utilizes at least one third party money transfer network between the destination of the money transfer transaction and the money transfer network;
analyze the selected multiple money transfer routing schemes; and
identify the preferable money transfer routing scheme at least partially based on the predefined criterion from among the multiple money transfer routing schemes
cause at least a subset of the selected multiple money transfer routing schemes to be presented at a user interface, wherein the subset includes the preferable money transfer routing scheme and at least one other money transfer routing scheme; and
receive from the user interface an instruction to implement a particular money transfer routing scheme from among the subset of the selected multiple money transfer routing schemes.

11. The system of claim 10, wherein the multiple money transfer routing schemes relate to international money transfer routing schemes and the preferable money transfer routing scheme is an international money transfer routing scheme.

12. The method of claim 10, wherein the preferable money transfer routing scheme is an internal money transfer routing scheme.

13. The system of claim 10, wherein the preferable money transfer routing scheme is an external money transfer routing scheme.

14. The system of claim 10, wherein the predefined criterion is used to identify the preferable money transfer routing scheme according to a maximized amount of profitability of the money transfer transaction for the money transfer network.

15. The system of claim 10, wherein the predefined criterion is used to identify the preferable money transfer routing scheme according to a minimized amount of time to execute the money transfer transaction.

16. A non-transitory computer-readable storage medium having computer executable instructions stored thereon for analyzing multiple money transfer routing schemes to identify a preferable money transfer routing scheme from among the multiple money transfer routing schemes according to at least one predefined criterion, the computer executable instructions comprising instructions executed by a computer for:
receiving at least one predefined criterion, wherein the predefined criterion is used to analyze multiple money transfer routing schemes;
receiving an indication of a source for a money transfer transaction;
receiving an indication of a destination for the money transfer transaction;
selecting multiple money transfer routing schemes, wherein:
each of the selected multiple money transfer routing schemes comprises a route to transmit funds from the source for the money transfer transaction to the destination for the money transfer transaction;
at least one internal money transfer routing scheme and at least one external money transfer routing scheme are selected;
an internal money transfer routing scheme refers to a money transfer routing scheme that utilizes a direct money transfer arrangement between the destination of the money transfer transaction and the money transfer network; and
an external money transfer routing scheme refers to a money transfer routing scheme that utilizes at least one third party money transfer network between the destination of the money transfer transaction and the money transfer network;

analyzing the selected multiple money transfer routing schemes; and identifying the preferable money transfer routing scheme at least partially based on the predefined criterion from among the analyzed multiple money transfer routing schemes;

causing at least a subset of the selected multiple money transfer routing schemes to be presented at a user interface, wherein the subset includes the preferable money transfer routing scheme and at least one other money transfer routing scheme; and receiving from the user interface, by the computer system, an instruction to implement a particular money transfer routing scheme from among the subset of the selected multiple money transfer routing schemes.

17. The non-transitory computer-readable storage medium of claim 16, wherein the preferable money transfer routing scheme is the external money transfer routing scheme.

18. The non-transitory computer-readable storage medium of claim 16, wherein the predefined criterion is used to identify the preferable money transfer routing scheme according to a maximized amount of profitability of the money transfer transaction for an entity operating the computer system.

19. The non-transitory computer-readable storage medium of claim 16, wherein the predefined criterion is used to identify the preferable money transfer routing scheme according to a minimized amount of time to execute the money transfer transaction.

20. The non-transitory computer-readable storage medium of claim 16, wherein the computer executable instructions further comprise instructions for routing the money transfer transaction from the source to the destination according to the preferable money transfer routing scheme.

* * * * *